(12) United States Patent
Haltakov et al.

(10) Patent No.: US 10,930,148 B2
(45) Date of Patent: Feb. 23, 2021

(54) METHOD AND DEVICE FOR REMINDING A DRIVER ABOUT AN APPROACH TO A LIGHT SIGNAL APPARATUS

(71) Applicant: Bayerische Motoren Werke Aktiengesellschaft, Munich (DE)

(72) Inventors: Vladimir Haltakov, Munich (DE); Richard Rau, Dachau (DE); Artur Russ, Weilheim (DE); Joeran Zeisler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/570,014

(22) Filed: Sep. 13, 2019

(65) Prior Publication Data

US 2020/0005636 A1 Jan. 2, 2020

Related U.S. Application Data

(63) Continuation of application No. PCT/EP2018/054701, filed on Feb. 26, 2018.

(30) Foreign Application Priority Data

Mar. 14, 2017 (DE) .......................... 102017204254.0

(51) Int. Cl.
*G08G 1/0962* (2006.01)
*G06K 9/00* (2006.01)
*B60K 35/00* (2006.01)

(52) U.S. Cl.
CPC ..... *G08G 1/09626* (2013.01); *G06K 9/00825* (2013.01); *B60K 35/00* (2013.01)

(58) Field of Classification Search
CPC ............. G08G 1/0962; G08G 1/09623; G08G 1/096716; G08G 1/09675; G08G 1/096783

See application file for complete search history.

(56) References Cited

U.S. PATENT DOCUMENTS

| 6,820,709 | B1 | 11/2004 | Zimmermann et al. |
| 2009/0312888 | A1 | 12/2009 | Sickert et al. |

(Continued)

FOREIGN PATENT DOCUMENTS

| DE | 199 58 520 A1 | 6/2001 |
| DE | 10 2007 029 482 A1 | 1/2009 |

(Continued)

OTHER PUBLICATIONS

International Search Report (PCT/ISA/210) issued in PCT Application No. PCT/EP2018/054701 dated Jun. 8, 2018 with English translation (seven (7) pages).

(Continued)

*Primary Examiner* — Omeed Alizada
(74) *Attorney, Agent, or Firm* — Crowell & Moring LLP (57) ABSTRACT

A method reminds a driver of a motor vehicle about an approach to a light signal apparatus. The method detects a plurality of light signal apparatuses, selects from the plurality of light signal apparatuses in order to select that one which is relevant to a direction of travel of the motor vehicle to determine an assignment of the detected light signal to the motor vehicle, and determines whether the detected light signal from the selected light signal apparatus is a stop light signal. The method generates a stop signal if a stop light signal is detected when the motor vehicle is at a standstill. When a stop signal is present, the method determines a reliability value depending on the at least one operating variable of the motor vehicle for the selection of the light signal apparatus, generates a confirmation signal verifying the selection, depending on the reliability value, and outputs the confirmation signal in order to inform the driver about a verified selection, and generates a starting signal reminding the driver to start, depending on the reliability value, when a changeover on a traffic light signal is detected.

15 Claims, 5 Drawing Sheets

(56) References Cited

U.S. PATENT DOCUMENTS

| | | | |
|---|---|---|---|
| 2010/0033571 A1* | 2/2010 | Fujita | B60W 40/02 348/149 |
| 2014/0222280 A1 | 8/2014 | Salomonsson et al. | |
| 2016/0318490 A1* | 11/2016 | Ben Shalom | B60T 7/18 |

FOREIGN PATENT DOCUMENTS

| | | |
|---|---|---|
| DE | 10 2008 010 968 A1 | 9/2009 |
| DE | 10 2011 116 304 A1 | 4/2012 |
| DE | 10 2013 203 653 A1 | 9/2014 |
| DE | 10 2015 003 847 A1 | 8/2015 |
| DE | 10 2015 005 222 A1 | 12/2015 |
| EP | 2 093 738 A2 | 8/2009 |
| JP | 2010-123100 A | 6/2010 |
| WO | WO 2015/055185 A1 | 4/2015 |

OTHER PUBLICATIONS

German-language Written Opinion (PCT/ISA/237) issued in PCT Application No. PCT/EP2018/054701 dated Jun. 8, 2018 (eight (8) pages).

German-language Search Report issued in counterpart German Application No. 10 2017 204 254.0 dated Nov. 30, 2017 with partial English translation (12 pages).

International Search Report (PCT/ISA/210) issued in PCT Application No. PCT/EP2018/054702 dated Jul. 27, 2018 with English translation (nine (9) pages).

German-language Written Opinion (PCT/ISA/237) issued in PCT Application No. PCT/EP2018/054702 dated Jul. 27, 2018 (10 pages).

German-language Search Report issued in counterpart German Application No. 10 2017 204 256.7 dated Nov. 30, 2017 with partial English translation (11 pages).

\* cited by examiner

METHOD AND DEVICE FOR REMINDING A DRIVER ABOUT AN APPROACH TO A LIGHT SIGNAL APPARATUS

CROSS REFERENCE TO RELATED APPLICATIONS

This application is a continuation of PCT International Application No. PCT/EP2018/054701, filed Feb. 26, 2018, which claims priority under 35 U.S.C. § 119 from German Patent Application No. 10 2017 204 254.0, filed Mar. 14, 2017, the entire disclosures of which are herein expressly incorporated by reference.

BACKGROUND AND SUMMARY OF THE INVENTION

In general, the invention relates to motor vehicles, in particular motor vehicles with devices which are designed to remind a driver to travel onward at a light signal apparatus permitting onward travel. Furthermore, the invention relates to methods for reminding to travel onward at a light signal apparatus.

By a traffic light (light signal apparatus), a signal generator of a light signal system (LSA) is understood that is used to control road traffic. Traffic lights mandate a certain behavior for road users by emitting controlled signals. These traffic signs and light signals, which vary in shape and color, each have a different meaning and only work in the opposite direction of travel of the traffic to be regulated.

From DE 10 2011 116304 A1, a motor vehicle with a driver assistance system is known, which has an image processing apparatus, wherein light signals of a light signal apparatus of a light signal system are detected and then a further function is performed, wherein the further function comprises at least one from: a go reminder, a motor start, a symbol display of a state of the light signal system, a cross-fading between a mirror image in the inner mirror and an image of the light signal system, and a light switching or switching on of the image display apparatus. However, no information is provided to the driver about the reliability of the detection process of the light signals.

This can result, in the event of an unsuccessful detection process for the light signals, in a reminder process not taking place, but the driver relying on the then incorrectly functioning device and not paying attention to a signal change, which results in an unnecessary standstill at a light signal apparatus permitting onward travel.

It is therefore the object of the present invention to provide the ability to be able to reduce unnecessary standstill periods at a light signal apparatus permitting onward travel.

This object is achieved by a method for reminding a driver of a motor vehicle to travel onward at a light signal apparatus, as well as by a device carrying out the method, a motor vehicle with such a device, a computer program and a computer program product in accordance with the claimed invention.

In accordance with a first aspect, a method for reminding a driver of a motor vehicle to travel onward at a light signal apparatus is provided, comprising the steps of:
  detecting a plurality of light signal apparatuses,
  selecting from the plurality of light signal apparatuses in order to select the one that is relevant to a direction of travel of the motor vehicle and determining if a detected light signal of the selected light signal apparatus is a stop light signal,
  generating a stop signal if a stop light signal has been detected and a standstill of the motor vehicle has been detected,
  in the presence of the stop signal, detecting and analyzing operating data in order to determine a reliability value for the selection of the light signal apparatus,
  generating a confirmation signal verifying the selection, depending on the reliability value, if a comparison results in the reliability value being greater than a predetermined threshold value, as well as outputting the confirmation signal in order to inform the driver of a verified selection, and
  generating a go signal reminding the driver to travel onward, depending on the reliability value, if a go light signal has been detected based on the analysis of another image data record.

The plurality of light signal apparatuses can, for example, be detected by analyzing an image data record. Thereby, the analysis of the image data record can also comprise the detection of the light signals of the light signal apparatuses. The image data record can be detected by means of a camera of the motor vehicle, which also provides image data for other driver assistance systems, for example. A standstill of the motor vehicle can take place after the driver stops the motor vehicle in front of a light signal apparatus prohibiting further travel, for example, by means of analyzing motor vehicle operating parameters, such as odometer data or wheel rotational speed sensors.

The image data record is analyzed with regard to which of the light signal apparatuses is relevant to the motor vehicle, meaning if it has to do with a light signal apparatus for motor vehicles or for bikers and if the respective light signal direction concerns the direction of travel of the motor vehicle, meaning, for example, regulating vehicles turning right or left if such a turning operation is planned based on the lane. Furthermore, for example, the image data record is analyzed in order to determine whether a current light signal of the light signal apparatus prohibits onward travel. This can be a red traffic light, i.e. the red—and usually topmost—light of the traffic light is activated. In addition, there can also be provision to consider a light signal as being a light signal prohibiting onward travel if the yellow—and usually middle—light of the traffic light is activated.

If the light signal apparatus prohibits onward travel, i.e. a stop light signal is present and the motor vehicle is at a standstill, a stop signal is generated and brought to the attention of the driver. It can be an acoustic signal and/or an optical signal, wherein the optical signal, for example, can be projected into the windshield by means of a head-up display or displayed on another display device.

In addition, further data are collected and analyzed upon the presence of the stop signal in order to determine a reliability value for the selection of the light signal apparatus. The reliability value is a measure for the degree of safety with which the light signal apparatus relevant to the motor vehicle has been detected. For this purpose, for example, the reliability value is compared with a threshold value and the confirmation signal verifying the selection is generated if the comparison results in the reliability value being greater than a predetermined threshold value. The confirmation signal is also brought to the driver's attention by outputting it to inform him/her of a verified selection. The confirmation signal can be an acoustic signal and/or an optical signal, wherein the optical signal, for example, can be projected into the windshield by means of a head-up display or displayed on another display device. Thereby, information is provided to the driver, based on which he/she can recognize that the selected light signal apparatus is the "correct" light signal apparatus for the motor vehicle and can assume, in the case of the selected light signal apparatus permitting travel, to be reminded about onward travel. For this purpose, in addition to the color of the light signal of the light signal apparatus, the direction(s) regulated by the light signal apparatus can also be shown.

Ultimately, a go signal is generated if a go light signal, which indicates that onward travel is permitted, has been detected by analyzing another image data record. In the case of the go light signal, it can be a green traffic light, meaning the green light—which is usually located at the very bottom—of the light signal apparatus is activated. Alternatively, it can also be provided that all the lights of the light signal apparatus going out is to be regarded as being a go light signal. For instance, this is the case with traffic lights having only two lights, for example, red and yellow, meaning in the case of so-called pedestrian-operated traffic lights. In this case, displaying a green traffic light in the display of the driver would be inappropriate and confusing since the pedestrian-operated traffic light going out does not result in an unrestricted permission to travel as is the case with a green light. Rather, the intersection is thereby downgraded to the next applicable regulation. However, the driver can be reminded that the traffic light has gone out, but it must be differentiated from a green traffic light.

The go signal addresses at least one of the driver's senses, such as their sense of sight, hearing or touch, in order to remind him/her to travel onward.

In accordance with an embodiment, the provision of the go signal can be ended if an onward travel of the motor vehicle upon a detected go light signal has been detected. This can be done, for example, by means of a driver becoming active. Thereby, the onward travel can also take place before generating the go signal, meaning the generation of the go signal is skipped so to say. By an onward travel of the motor vehicle, the vehicle being set into motion is understood, however also that actions of the driver are detected, which are indicative of onward travel or a desire for onward travel, such as putting into gear or releasing a brake.

Furthermore, a state of a driving direction indicator of the motor vehicle can be detected as an operating variable and analyzed. A driving direction indicator is a light-engineering apparatus of motor vehicles and is used by road users in road traffic as information concerning a change of the direction of travel or the notification thereof. As a rule, this is implemented as a blinking light. It is colloquially referred to as a blinker. In this way, for example, the driving direction indicator on the left side of the motor vehicle can be activated in order to indicate a left turn and the selected light signal apparatus is associated with a left-turn lane. Thus, the activated state of the left driving direction indicator can be analyzed as a confirmation that the correct light signal apparatus has been selected.

In accordance with an embodiment, consolidated data from a navigation device of the motor vehicle and a localization derived from a detection of the surroundings can be analyzed as operating variables in order to determine which lane and thereby which direction of travel an actual position of the motor vehicle is associated with. By means of a passive navigation device, for example, meaning it is only used for route guidance, it is therefore detected that the motor vehicle is located on a left-turn lane. Thus, the determined position on a left-turn lane can be analyzed as a confirmation that the correct light signal apparatus has been selected.

In accordance with an embodiment, it can be detected and analyzed with a navigation device of the motor vehicle in which direction travel is continued in accordance with the route determined by the navigation device. Here, a destination has thus been entered into the navigation device by the driver in advance and then the driver drives in accordance with the route specified by the navigation device. Accordingly, it can be determined that, in accordance with this route, a turn to the left is now provided in order to reach the destination. Thus, the route determined by the navigation device can be regarded as a confirmation that the correct light signal apparatus has been selected.

In accordance with an embodiment, one or a plurality of external variables can be analyzed as operating variable(s). External variables are transferred to the motor vehicle via wireless data transmission connections, upon a query of the motor vehicle, for example. In this way, for example, data from a cloud or other traffic management and/or control apparatuses can be taken into account and analyzed, which contain information on the respective traffic light phases, for example. This is referred to as car-to-infrastructure (C2I) or vehicle-to-roadside (V2R).

In accordance with an embodiment, the confirmation signal can be generated if a comparison results in the reliability value being greater than a predetermined threshold value. This provides a meaningful confirmation signal in a simple and secure way.

In accordance with another aspect, a device for reminding a driver of a motor vehicle to travel onward at a light signal apparatus is provided.

In accordance with another aspect, a motor vehicle comprises such a device.

In accordance with another aspect, a computer program having program code means is provided in order to carry out all steps of one of the indicated methods if the computer program is run on a computer or one of the indicated devices.

In accordance with another aspect, a computer program product is provided, which contains a program code, which is stored on a computer-readable data carrier and which, if it is run on a data processing apparatus, carries out one of the indicated methods.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
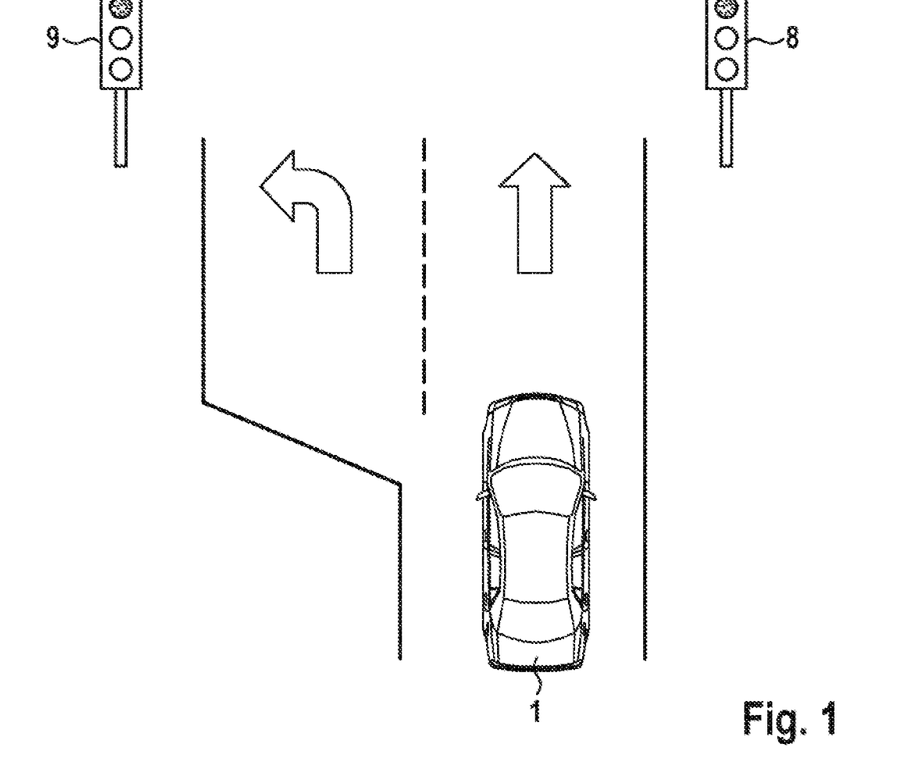
FIG. 1 is a schematic illustration of a traffic scenario in which a driver of a motor vehicle is reminded of onward travel.

FIG. 1 schematically shows a motor vehicle 1, which is designed as a passenger car in the present exemplary embodiment. The motor vehicle 1 approaches an intersection with a traffic light in the traffic scenario shown in FIG. 1, wherein the lane divides into two lanes. A first lane is provided for driving straight ahead and, if required, for cars turning right, while a second lane is provided for cars turning left.

A first light signal apparatus 8 is assigned to the first lane and a second light signal apparatus 9 is assigned to the second lane.

In the present exemplary embodiment, the motor vehicle 1 comprises an assistance system, which is designed to detect light signals of the two light signal apparatuses 8, 9 and to determine that one of the two light signal apparatuses 8, 9—in the present exemplary embodiment, the light signal apparatus 9 associated with the second lane—is relevant to the planned onward travel of the motor vehicle 1 by means of turning left, meaning the travel of the motor vehicle 1 can only take place depending on the light signals of the relevant light signal apparatus 9.

Upon a changing of a stop light signal to a go light signal of the relevant light signal apparatus 9, a go reminder signal is generated in order to remind the driver of onward travel. However, it can occur that a selection of the respective light signal apparatus 8, 9 does not take place for the correct lane, for example, due to image data with bad quality or because, due to a plurality of light signal apparatuses, such as traffic lights for motor vehicle traffic and bikers, as well as local public transport, a clear selection of the light signal apparatuses 8, 9 is not possible. In such a case, the reminder process by generating the go signal does not take place, which can result in an unnecessary standstill at a light signal apparatus permitting onward travel.

Therefore, in the present exemplary embodiment, the motor vehicle 1 comprises a device 3 for reminding a driver of a motor vehicle to travel onward at a light signal apparatus, which is now explained with reference to FIG. 2.

Figure 2:
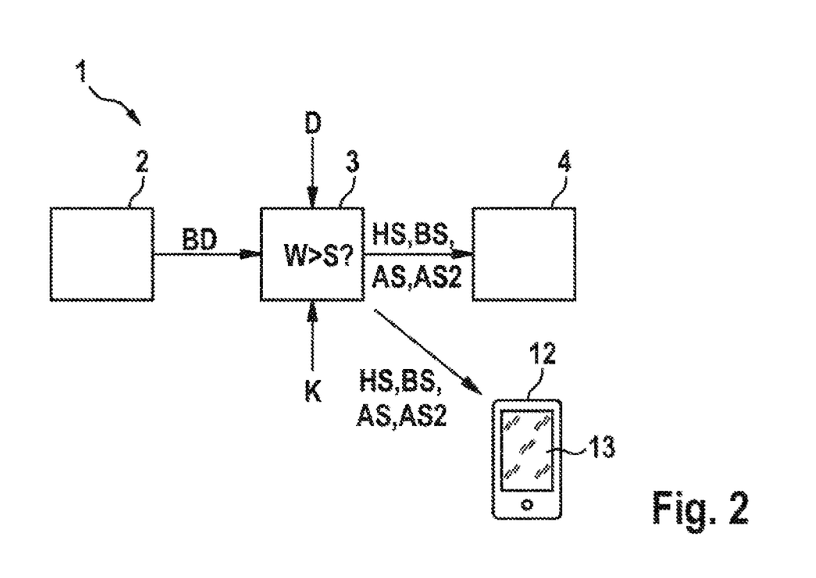
FIG. 2 is a schematic illustration of a device for reminding a driver of a motor vehicle to travel onward at a light signal apparatus.

In FIG. 2, a camera 2, the device 3 for reminding a driver of the motor vehicle 1 to travel onward at the relevant light signal apparatus 9 and an output apparatus 4 are shown.

The camera 2 is designed to make an image data record BD of one or a plurality of light signal apparatuses 8, 9 available and to transmit it to the device 3.

Furthermore, the device 3 is designed to read in motor vehicle operating parameters K of the motor vehicle 1, such as odometer data or wheel rotational speed sensor data, and to determine a standstill of the motor vehicle 1 by analyzing of the motor vehicle parameters K.

Furthermore, the device 3 is designed to determine a selection of the detected light signal for the motor vehicle 1, meaning to determine if the respective light signal apparatus 8, 9 provides light signals preventing onward travel for the motor vehicle 1. Furthermore, the device 3 is designed to determine if the detected light signal is a stop light signal.

The device 3 generates a stop signal HS if a stop light signal and a standstill of the motor vehicle 1 have been detected. The stop signal HS is transferred to the output apparatus 4.

The output apparatus 4 is designed to output an acoustic signal and/or an optical signal upon receiving the stop signal HS. In the present exemplary embodiment, an optical signal is projected into the windshield 6 in the form of a traffic light symbol 5 by means of a head-up display (see FIG. 4), for example, or displayed on another display device, such as an instrument cluster 7 for example (see FIG. 5).

Figure 4:
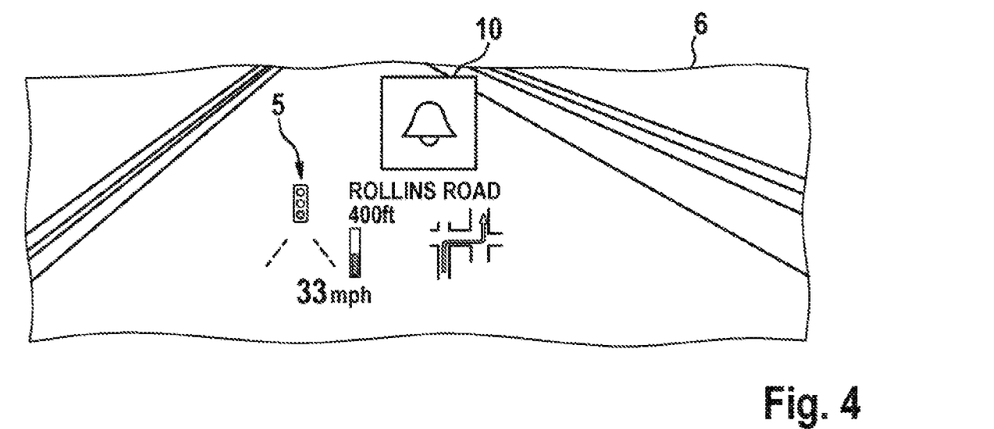
FIG. 4 is a schematic illustration of a projection onto the windshield of the motor vehicle generated by way of a head-up display.
Figure 5:
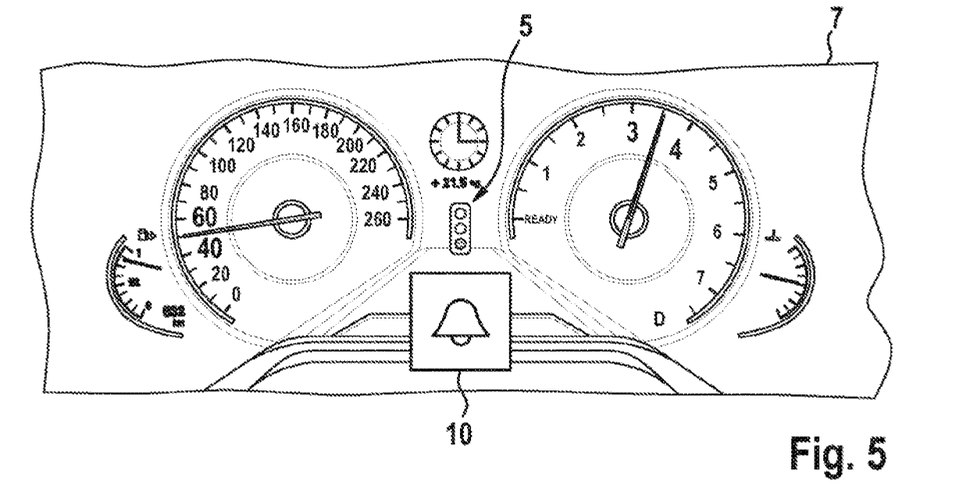
FIG. 5 is a schematic illustration of a section of a dashboard of the motor vehicle.

The traffic light symbol 5 can be designed in such a way that, in the presence of a stop light signal, it comprises a red traffic light, meaning the red—and usually the topmost—light of the traffic light symbol 5 is shown to be illuminated while, in the case for example of a go light signal, it comprises a green traffic light, meaning the green light—which is usually located at the very bottom—of the traffic light symbol 5 is shown to be illuminated. Furthermore, the display form and type can change, for example, the light signal 5 can pulse in the case of a green traffic light and have a changing level of brightness.

Furthermore, the device 3 is designed to detect and analyze other operating variables D in order to determine a reliability value W. The reliability value W is a measure for the degree of safety with which the light signal apparatus 9 relevant to the motor vehicle 1 has been detected.

For this purpose, operating variables D of the motor vehicle 1 are analyzed, which are transmitted between different control devices of the motor vehicle 1, for example, via a CAN bus. In the present exemplary embodiment, the operating variables D include a state of a driving direction indicator of the motor vehicle 1, meaning whether this was activated by the driver.

In addition, or as an alternative, the operating variables D can be provided by a navigation device. The operating variables D then show in which lane the motor vehicle 1 is located. Since different lanes at intersections, for example, are associated with different directions, such as the right and left-turn lane, it is possible to determine that the motor vehicle 1 is on a left-turn lane. For this purpose, consolidated data from a navigation device and a localization derived from a detection of the surroundings, for example, with the aid of a detection of ground markings, can be taken into account.

Furthermore, in addition or as an alternative, it can be provided that the operating variables D contain information concerning what direction travel is to be continued along in accordance with the route determined by the navigation device. Here, the navigation device is therefore active, meaning, at the beginning of the journey, a destination was specified by the driver and the navigation device has calculated a route in order to reach this destination. Accordingly, it can be determined that, in accordance with this route, a turn to the left is now provided in order to reach the destination.

Furthermore, in addition or as an alternative, it can be provided to analyze external variables as operating variables. In this way, for example, data from a cloud or other traffic management and/or control apparatuses can be taken into account and analyzed, which contain information on the respective traffic light phases, for example.

The device 3 may be designed to compare the determined reliability value W with a predetermined threshold value S. If the comparison results in the reliability value W being greater than the predetermined threshold value S, the device 3 generates a confirmation signal BS, which is also transmitted to the output apparatus 4.

The output apparatus 4 is designed to emit another acoustic signal and/or optical signal upon receiving the confirmation signal BS, which is projected into the windshield 6 in the form of a bell symbol 10 (see FIG. 3) by means of the head-up display, for example, or is displayed on another display apparatus, such as the instrument cluster 7 (see FIG. 5).

The device 3 is furthermore designed to generate a go signal AS if an analysis of a subsequently acquired image data record BD results in a go light signal, such as a green traffic light, now being present.

Ultimately, the device 3 can be designed so that the generation of the go signal AS is ended if onward travel of the motor vehicle 1 upon a detected go light signal is detected, for example by analyzing the motor vehicle operating parameters K.

Furthermore, in the present exemplary embodiment, the device 3 is designed to generate another go signal AS2 if no onward travel of the motor vehicle 1 has been detected after a time period t1 elapses. In the present exemplary embodiment, the go signal AS and the other go signal AS2 can address different senses of the driver. In the present exemplary embodiment, the first go signal AS addresses the sense of sight of the driver as an optical signal while the second go signal AS2 addresses the sense of hearing of the driver as an acoustic signal. Deviating from the present exemplary embodiment, for example, the second go signal AS2 as a haptic signal can address the sense of touch of the driver.

Furthermore, in the present exemplary embodiment, the device 3 is designed to suppress the generation of at least one go signal AS, AS2 if a road user is detected upon detecting a go light signal, which is located in front of the motor vehicle in the direction of travel of the motor vehicle and is standing still. For this purpose, the image data record BD can be analyzed in a corresponding manner by the device 3.

The device 3 can be designed to generate the first go signal AS directly upon a detected go light signal. Furthermore, the device 3 is designed to generate the second go signal AS2 after the first go signal AS with a time delay.

Thereby, a time period t1 between the generation of the first go signal AS and of the second go signal AS2 can be adapted depending on a detected parameter.

The parameter may indicate a visibility of the light signal apparatus 9 by the driver, an alertness of the driver, an availability of the motor vehicle 1, traffic flow dynamics, a traffic density and/or a type of surroundings or can be parameterized freely by the driver.

For example, by analyzing the image data record BD, it can be determined whether the driver can perceive a light signal change of the light signal apparatus 9 without any problem or not. If there is no visibility of the light signal apparatus 9, the time period can be reduced by a predetermined value or factor.

With an interior camera, the driver's alertness can be detected. For example, it is detected in which direction the driver is currently looking or whether he/she has closed his/her eyes. As a result of a detected reduced attentiveness, the additional time period t2 until the other go signal AS2 is generated can be reduced to zero. At the same time, generation of the first go signal AS can be dispensed with.

By availability, a quick or slow activatability of the drive motor of the motor vehicle 1 is understood. For example, there is a fast activatability if an internal combustion engine has been started by a start/stop system or the start/stop system is active in order to start the internal combustion engine. In such a case, the time period t1 can be reduced.

By traffic flow dynamics, it is understood how quickly a front vehicle moves in response to a go light signal. For this purpose, the image data record BD is analyzed in order to detect which time period passes from a change to a go light signal until the onward travel of the front vehicle. A short time period indicates high traffic flow dynamics, such as in urban regions, while a long time period indicates low traffic flow dynamics, such as in rural regions. In the case of high traffic flow dynamics, the time period t1 can be reduced while, in the case of low traffic flow dynamics, the time period t1 can be increased.

The traffic density can be determined by analyzing the image data record BD by determining, for example, the number of road users located within the surroundings of the motor vehicle 1. A large number of road users is considered to be indicative of a high traffic density, while a small number of road users is viewed as being indicative of a low level of traffic flow density. In the case of high traffic density, the time period t1 can be reduced while, in the case of low traffic density, the time period t1 can be increased.

The type of surroundings indicates whether the motor vehicle 1 is currently moving in an urban or rural environment. For this purpose, data of a navigation device of the motor vehicle 1 are analyzed. In an urban area, the time period t1 can be reduced, while in a rural area, the time period t1 can be increased.

Furthermore, in the present exemplary embodiment, the device 3 is designed to transmit the stop signal HS, the confirmation signal BS, the go signal AS and the other go signal AS2 via an interface designed for wireless data transmission.

Figure 6:
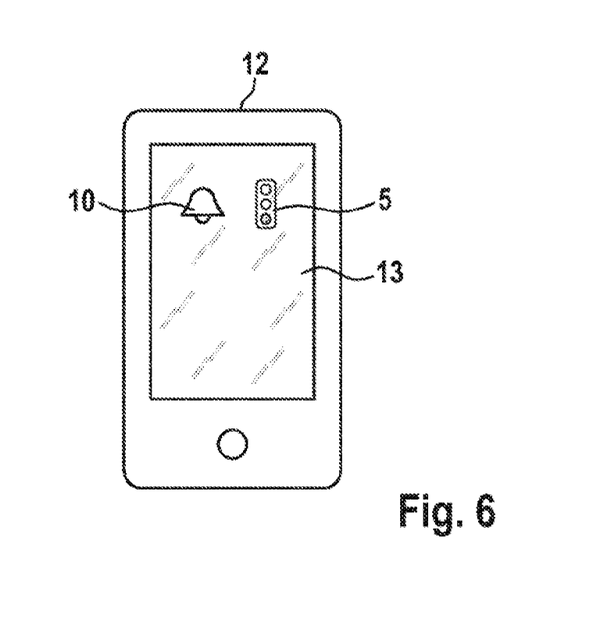
FIG. 6 is a schematic illustration of a mobile output device.

Furthermore, the device 3 is designed to analyze image data of an interior camera of the motor vehicle 1 in order to determine a direction of view of a driver of the motor vehicle 1 and a position of a mobile, portable output device 12 as well as an orientation of the mobile output device 12. Deviating from the present exemplary embodiment, the device 3 can also be designed to determine a direction of view of the driver on a permanently installed output device, such as a display.

During operation (see FIG. 3), during a first phase I, the motor vehicle 1 approaches a light signal apparatus 9 prohibiting onward travel.

Figure 3:
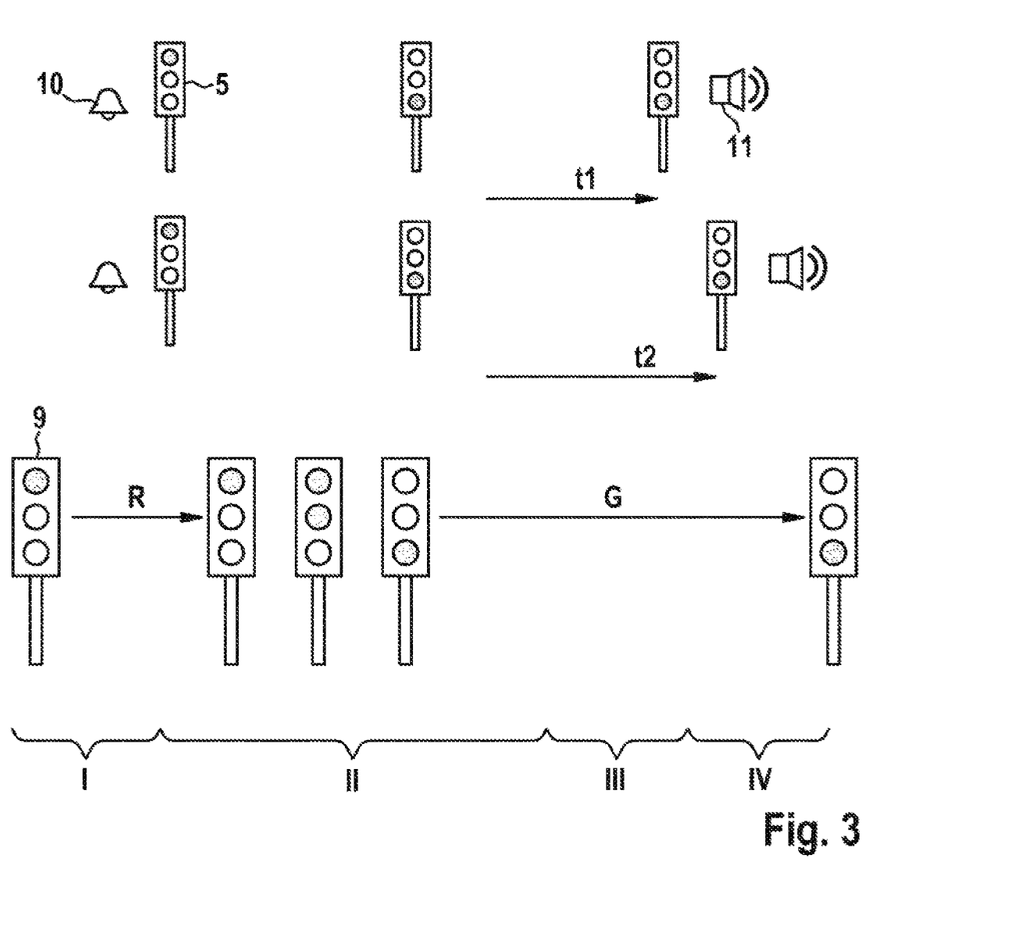
FIG. 3 illustrates an operation scheme.

Image data records BD are continuously transmitted from the camera 2 to the device 3 and analyzed. As soon as the motor vehicle 1 is less than a minimum distance from the light signal apparatus 9, for example 40 m, the image data records BD can be analyzed in order to detect the actual light signal.

The first phase I ends and the second phase II begins if an analysis of the motor vehicle operating parameters K by the device 3 results in the motor vehicle 1 being at a standstill.

Since the detected light signal concerns the motor vehicle 1 and is a stop light signal, the device 3 now generates the stop signal HS during the second phase II, and then, in the present exemplary embodiment, the output apparatus 4 projects an optical signal into the windshield 6 in the form of a traffic light symbol 5 (symbolizing a red traffic light) by means of the head-up display (see FIG. 4) or displays it on another display device, such as the instrument cluster 7, for example (see FIG. 5). If, by contrast, the stop signal HS is transmitted to the mobile output device 12, the traffic light symbol 5 is displayed on the screen 13 of the mobile output device 12 (see FIG. 6).

Furthermore, during the second phase II, the other operating variables D are detected by the device 3 and analyzed in order to compare the reliability value W with the threshold value S. If the comparison results in the reliability value W being greater than the predetermined threshold value S, the confirmation signal BS is also generated by the device 3 during the second phase II. Then, in the present exemplary embodiment, the output apparatus 4 projects an optical signal into the windshield 6 in the form of a bell symbol 10 by means of the head-up display or outputs said symbol with a display apparatus, such as the instrument cluster 7 for example. Alternatively, the confirmation signal BS is transmitted to the mobile output device 12 and displayed there on the screen 13.

During the second phase II, the red phase R of the light signal apparatus ends, and after a transition phase with simultaneously active red and yellow light of the light signal apparatus 9, a green phase G of the light signal apparatus 9 begins. Furthermore, in the present exemplary embodiment, the bell symbol 10 goes out.

If an analysis of another image data record BD results in the light signal apparatus changing to green in the meantime, meaning the go light signal is present, the device 3 generates the go signal AS. For this purpose, the traffic light symbol 5 is now modified, for example (a green traffic light is symbolized or displayed).

The second phase II ends and a third phase III begins if the device 3 detects, by means of analyzing the motor vehicle operating parameters K, that an onward travel operation has been initiated by the driver. Afterwards, the generation of the go signal AS is ended, meaning the traffic light symbol 5 goes out.

However, if onward travel is not performed, after the time period t1 elapses, the other go signal AS2 is additionally generated, such as in the form of an acoustic reminder 11. If, by means of analyzing the motor vehicle operating parameters K, it is detected that the driver has now initiated an onward travel operation, the generation of the first go signal AS and of the second go signal AS2 is ended, meaning that the traffic light symbol 5 and the acoustic reminder 11 disappear (see phase IV).

If, however, a front vehicle is located in front of the motor vehicle 1 at the light signal apparatus 9 and only starts moving after a time period has elapsed and then is no longer an obstacle for onward travel of the motor vehicle 1, it is waited again for another time period t2 to elapse until the go signal AS and the other go signal AS2 are generated and output. As an alternative, the time period t1 can also be started in a time-delayed manner, wherein the trigger is the detected onward travel of the front vehicle.

If, by contrast, the motor vehicle 1 approaches an intersection with a traffic light (see FIG. 1), the motor vehicle 1 is initially located in a region with only a single lane. Here the driver has not yet activated the driving direction indicator. As a result, the determination of the reliability value W results in a value that is smaller than the threshold value S and no confirmation signal BS is generated.

If the motor vehicle 1 drives forward further in the direction of the light signal apparatus, a change to the left-turn lane takes place and, at the same time, the driver activates the driving direction indicator. As a result, the size of the reliability value W increases in such a way that it exceeds the threshold value S. A confirmation signal BS is then output.

Figure 7:
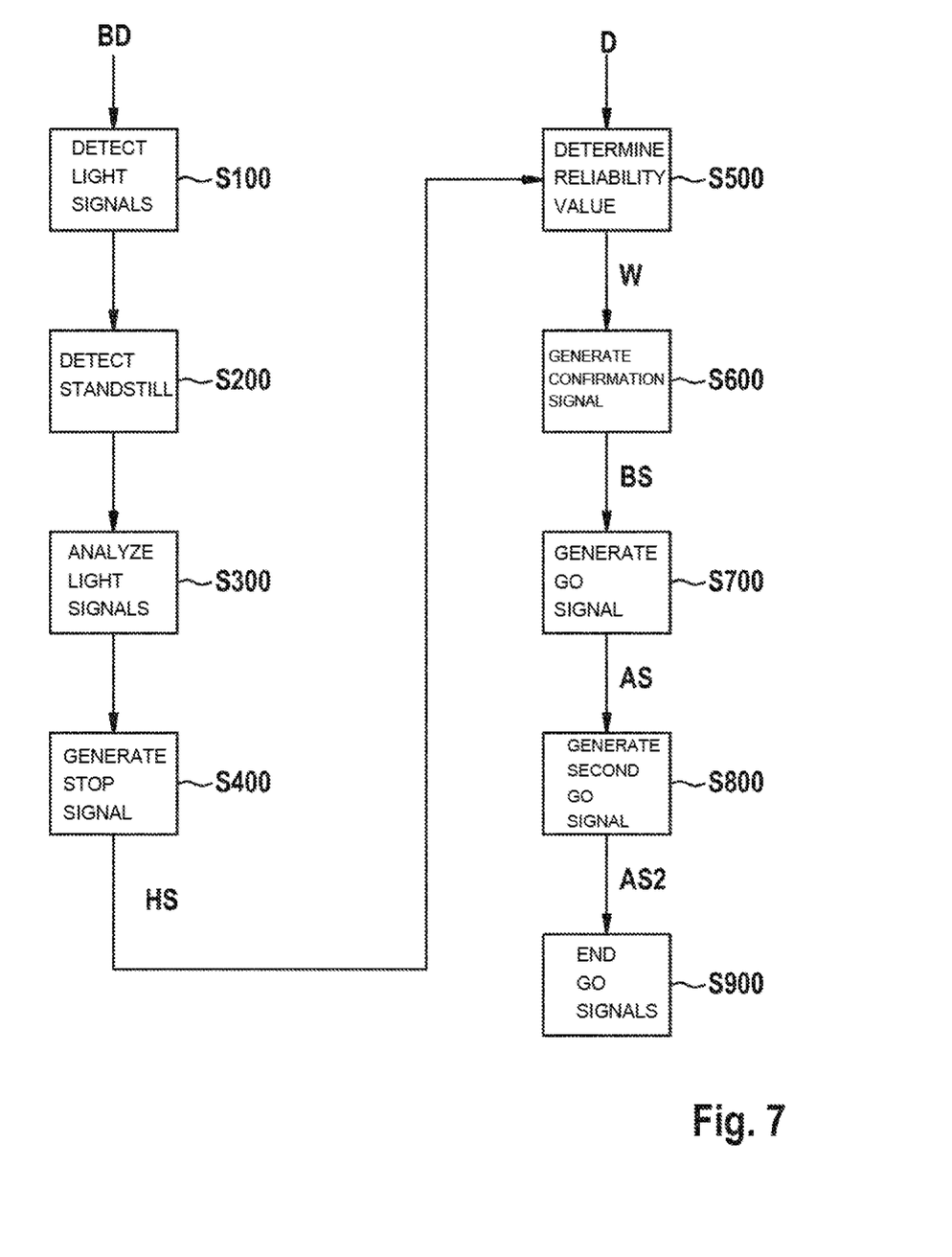
FIG. 7 is a schematic illustration of a method sequence.

Based on FIG. 7, a method sequence is explained when operating the device 3.

In a first step S100, light signals of a light signal apparatus are detected by analyzing the image data record BD.

At another step S200, a standstill of the motor vehicle 1 is detected by analyzing motor vehicle operating parameters K.

At another step S300, the light signals are analyzed in order to select a detected light signal for the motor vehicle 1 and to determine if the detected light signal is a stop signal, such as a red traffic light for example.

At another step S400, the stop signal HS is generated if a stop light signal and/or, at the same time, a standstill of the motor vehicle has been detected.

At another step S500, upon the presence of the stop signal HS, the other operating variables D are detected and analyzed in order to determine the reliability value W for the selected light signal.

At another step S600, the confirmation signal BS is generated if a comparison results in the reliability value W being greater than a predetermined threshold value S. Furthermore, the confirmation signal BS is output in order to inform the driver of a verified selection.

At another step S700, the go signal AS is generated if a go light signal has been detected by analyzing another image data record BD.

At another step S800, after the time period t1 expires, the other go signal AS2 is generated if, after the time period t1 expires, onward travel of the motor vehicle 1 has not been detected. If a front vehicle at the light signal apparatus 9 has been detected in front of the motor vehicle 1 and this has started moving, after the other time period t2 has elapsed, the go signal AS and the other go signal AS2 are generated and output.

At a step S900, the generation of the first go signal AS and, if applicable, of the second go signal AS2 as well as of the confirmation signal BS is ended if onward travel of the motor vehicle 1 upon a detected go light signal has been detected.

Deviating from the present exemplary embodiment, the order of the steps can also be different. In this way, the sequence of the individual steps can be interchanged, such as, for example, steps S100 and S200, or two or more steps can also be carried out at the same time/simultaneously.

Figure 8:
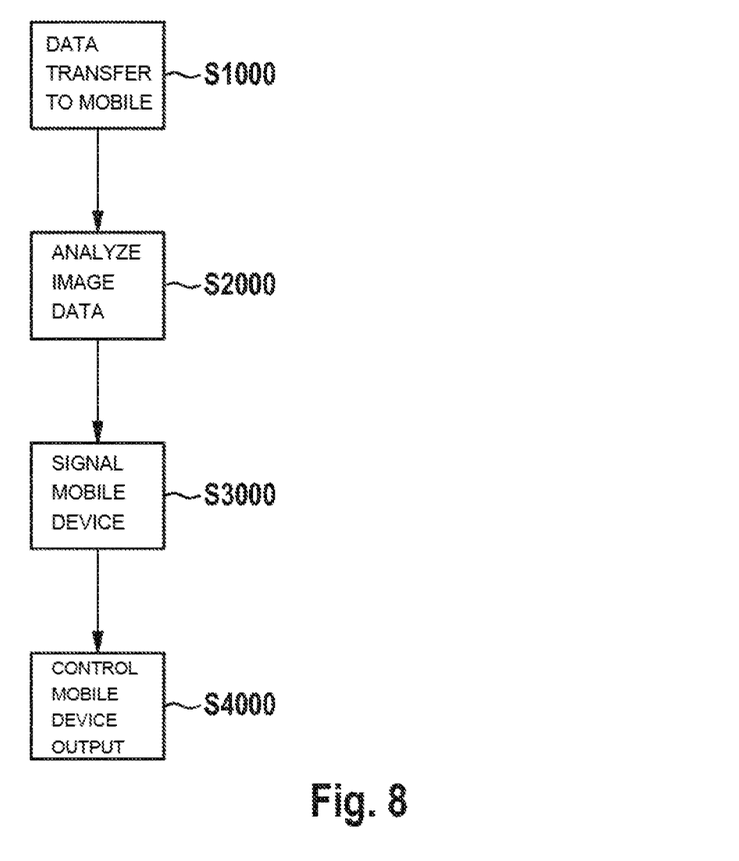
FIG. 8 is a schematic illustration of another method sequence.

Now, based on FIG. 8, an operation of the device 3 together with the mobile output device 12 is explained.

At a step S1000, it is checked by the device 3 if a data transfer to the mobile output device 12 is possible.

If this is the case, at a step S2000, image data of an interior camera of the motor vehicle 1 are analyzed in order to determine the direction of view of the driver, the position of the mobile output device 12 and the orientation of the mobile output device 12.

If it is determined that the mobile output device 12 is in the direction of view of the driver and is orientated in such a way that the driver looks at the screen 13 of the mobile output device 13, at a step S3000—depending on the current status—either the stop signal HS, the confirmation signal BS, the go signal AS and/or the other go signal AS2 is/are transmitted to the output device 12 and output in optical form on the screen 13.

In addition to an interior camera, information of the output device 12 itself can also be used in order to check a possible interaction with it. For this purpose, the output device 12 can provide such a function or it is carried out by means of coupling to the motor vehicle and an analysis by the latter.

If, by contrast, the analysis results in the driver holding the mobile output device 12 in his/her hand or it having body contact with the driver in another way, the mobile output device 12 is controlled at a step S4000 in such a way that the stop signal HS, the confirmation signal BS, the go signal AS and/or the other go signal AS2 is/are output in haptic form by means of a vibration alarm, for example.

Similarly, an output of the stop signal HS, of the confirmation signal BS, of the go signal AS, and/or of the other go signal AS2 can occur in haptic form by means of a vibration alarm, for example, if the detection and analysis of the orientation results in the driver observing the back side of the mobile output device 12.

The method explained based on FIG. 8 can be carried out periodically, for example, either at fixed intervals or prior to an output of the stop signal HS, of the confirmation signal BS, of the go signal AS and/or of the other go signal AS2, meaning prior to one of the steps S400, S600, S700 and/or S800 (see FIG. 7).

REFERENCE LIST 1 motor vehicle
2 camera
3 device
4 output apparatus
5 traffic light symbol
6 windshield
7 instrument cluster
8 light signal apparatus
9 light signal apparatus
10 bell symbol
11 acoustic reminder
12 output device
13 screen The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reminding a driver of a motor vehicle to travel onward at a light signal apparatus, comprising the steps of:
    detecting a plurality of light signal apparatuses;
    selecting from the plurality of light signal apparatuses in order to select one that is relevant to a direction of travel of the motor vehicle and determining if a detected light signal of the selected light signal apparatus is a stop light signal;
    generating a stop signal if, in the case of a standstill of the motor vehicle, a stop light signal is detected;
    if the stop signal is present, determining a reliability value for the selection of the light signal apparatus depending on at least one operating variable of the motor vehicle;
    generating a confirmation signal verifying the selection depending on the reliability value as well as outputting the confirmation signal in order to inform the driver of a verified selection; and
    generating a go signal, different from the confirmation signal, reminding the driver to travel onward depending on the reliability value if a changeover to a go light signal is detected.

2. The method according to claim 1, further comprising the step of:
    ending the generation of the go signal if onward travel of the motor vehicle upon a detected go light signal has been detected.

3. The method according to claim 1, wherein the at least one operating variable comprises a state of a driving direction indicator of the motor vehicle.

4. The method according to claim 1, further comprising the step of:
    analyzing consolidated data from a navigation device of the motor vehicle and a localization derived from a detection of surroundings as an operating variable in order to determine which lane and thereby which direction of travel an actual position of the motor vehicle is associated with.

5. The method according to claim 1, further comprising the step of:
    detecting and analyzing as an operating variable with a navigation device of the motor vehicle in which direction travel is continued in accordance with a route determined by the navigation device.

6. The method according to claim 1, wherein external variables are analyzed as an operating variable.

7. The method according to claim 1, wherein the confirmation signal is generated, if a comparison results in the reliability value being greater than a predetermined threshold value.

8. A device for reminding a driver of a motor vehicle to travel onward at a light signal apparatus, comprising:
    a processing device operatively configured to:
    detect a plurality of light signal apparatuses,
    select, from the plurality of light signal apparatuses, one which is relevant to a direction of travel of the motor vehicle and determine whether a detected light signal from the selected light signal apparatus is a stop light signal,
    generate a stop signal if a standstill of the motor vehicle and a stop light signal are detected,
    when the stop signal is present, determine a reliability value depending on at least one operating variable of the motor vehicle for the selection of the light signal apparatus,
    generate a confirmation signal verifying the selection, as well as output the confirmation signal in order to inform the driver about a verified selection, and
    generate a go signal, different from the confirmation signal, reminding the driver to drive onward, depending on the reliability value, when a changeover to a go light signal is detected.

9. The device according to claim 8, wherein the device is further configured to detect light signals of a light signal apparatus by analyzing an image data record.

10. A motor vehicle comprising a device according to claim 8.

11. A computer product comprising a non-transitory computer readable medium having stored thereon program code that, when executed, carries out the acts of:
    detecting a plurality of light signal apparatuses;
    selecting from the plurality of light signal apparatuses in order to select one that is relevant to a direction of travel of the motor vehicle and determining if a detected light signal of the selected light signal apparatus is a stop light signal;
    generating a stop signal if, in the case of a standstill of the motor vehicle, a stop light signal is detected;
    if the stop signal is present, determining a reliability value for the selection of the light signal apparatus depending on at least one operating variable of the motor vehicle;
    generating a confirmation signal verifying the selection depending on the reliability value as well as outputting the confirmation signal in order to inform the driver of a verified selection; and
    generating a go signal, different from the confirmation signal, reminding the driver to travel onward depending on the reliability value if a changeover to a go light signal is detected.

12. The method according to claim 1, further comprising:
suppressing the generation of the go signal in response to detecting a road user in front of the motor vehicle.

13. The method according to claim 1, further comprising:
determining whether the driver can perceive a change in one of the plurality of light signal apparatuses; and
reducing a time period between generating the go signal and a subsequent go signal in response to the determining whether the driver can perceive the change.

14. The method according to claim 1, further comprising:
detecting an alertness of the driver via an interior camera of the motor vehicle; and
reducing a time period between generating the go signal and a subsequent go signal in response to the detecting the alertness of the driver.

15. The method according to claim 14, further comprising:
detecting a responsiveness of a vehicle in front of the motor vehicle by measuring a first time period between a first time that the go light signal is detected and a second time that the vehicle in front begins onward travel; and
adjusting a second time period between generating the go signal and a subsequent go signal in response to the detected responsiveness.

* * * * *